(12) United States Patent
Sinha et al.

(10) Patent No.: US 7,687,163 B2
(45) Date of Patent: Mar. 30, 2010

(54) SOFT START FUEL CELL CONTROL STRATEGY

(75) Inventors: Manish Sinha, Pittsford, NY (US); Yeh-Hung Lai, Webster, NY (US); John C. Fagley, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 437 days.

(21) Appl. No.: 11/695,270

(22) Filed: Apr. 2, 2007

(65) Prior Publication Data

US 2008/0236930 A1 Oct. 2, 2008

(51) Int. Cl.
*H01M 8/04* (2006.01)
(52) U.S. Cl. .......................... 429/13; 429/24
(58) Field of Classification Search .............. 429/13, 429/22, 24
See application file for complete search history.

(56) References Cited

U.S. PATENT DOCUMENTS 7,517,600 B2 * 4/2009 Arthur et al. ............... 429/23
7,560,183 B2 * 7/2009 Fowler et al. .............. 429/13

OTHER PUBLICATIONS

Yeh-Hung Lai et al., Viscoelastic Stress Model and Mechanical Characterization of Perfluorosulfonic Acid (PFSA) Polymer Electrolyte Membranes, The Third International Conference on Fuel Cell Science, Engineering and Technology, Proceedines of Fuel Cell 2005: May 23-25, 2005, Ypsilanti, Michigan, pp. 1-7.

\* cited by examiner

Primary Examiner—Stephen J. Kalafut
(74) Attorney, Agent, or Firm—Dinsmore & Shohl LLP

(57) ABSTRACT

A method of operating an electrochemical conversion assembly is provided. According to the method, an assembly warm-up operation is executed by increasing the temperature $T_{STACK}$ of the membrane electrode assembly. Next, stoichiometry-based control of the relative humidity (RH) of one of the reactant flowfields is initiated when the temperature $T_{STACK}$ exceeds a threshold temperature $T_0$. The stoichiometry-based RH control comprises a reduction in the relative humidity from a value $RH_{WET}$ exceeding 100% relative humidity to a value $RH_{DRY}$ less than 100% relative humidity. The relative humidity value $RH_{DRY}$ is sufficiently low to permit reduction of an initial membrane hydration $\lambda_{WET}$ in the membrane electrode assembly. The reduction in the relative humidity to $RH_{DRY}$ is achieved by controlling the stoichiometry of the reactant flowfield and the temperature of the membrane electrode assembly such that the reduction to $RH_{DRY}$ decreases substantially continuously, relative to portions of the RH profile of the reactant flowfield prior to initiation of the stoichiometry-based control. The cell transitions from the stoichiometry-based RH control to generally elevated-temperature, temperature-based RH control when membrane hydration in the membrane electrode assembly falls below a target membrane hydration value $\lambda_{DRY}$. Additional methods and corresponding systems are contemplated.

20 Claims, 5 Drawing Sheets

SOFT START FUEL CELL CONTROL STRATEGY

CROSS-REFERENCE TO RELATED APPLICATIONS

The present application is related to U.S. patent application Ser. No. 11/464,226 (U.S. Patent Application Pub. No. 2008/0038594), filed Aug. 14, 2006; Ser. No. 11/466,832 (U.S. Pub. No. 2008/0050619), filed Aug. 24, 2006; and Ser. No. 11/467,596 (U.S. Pub. No. 2008/0050621), filed Aug. 28, 2006.

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. By way of illustration and not limitation, a typical cell comprises a membrane electrode assembly (MEA) positioned between a pair of flowfields accommodating respective ones of the reactants. More specifically, a cathode flowfield plate and an anode flowfield plate can be positioned on opposite sides of the MEA. The voltage provided by a single cell unit is typically too small for useful application so it is common to arrange a plurality of cells in a conductively coupled "stack" to increase the electrical output of the electrochemical conversion assembly.

The membrane electrode assembly typically comprises a proton exchange membrane separating an anode layer and a cathode layer of the MEA. The MEA is typically characterized by enhanced proton conductivity under wet conditions. For the purpose of describing the context of the present invention, it is noted that the general configuration and operation of fuel cells and fuel cell stacks is beyond the scope of the present invention. Rather, the present invention is directed to methods for managing MEA hydration cycling fatigue life in fuel cells. Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Patent Application Pub. No. 2005/0058864 and the accompanying text present a detailed illustration of the components of one type of fuel cell stack and this particular subject matter is expressly incorporated herein by reference.

BRIEF SUMMARY OF THE INVENTION

The durability of a fuel cell utilizing a hydrated MEA strongly depends on the hydration status of the polymer electrolyte membrane used in the MEA. To reduce the resistance of proton conductivity in the membrane, it is normally desired to keep the polymer electrolyte membrane sufficiently hydrated. However, the present inventors have recognized that under typical operating conditions the MEA cycles through relatively wet and relatively dry states. These membrane hydration cycles are particularly prevalent during fuel cell start-up operations.

One of the consequences of the aforementioned hydration cycling is significant degradation of the mechanical durability of the MEA. More specifically, the fatigue cycle life of a MEA is directly related to membrane stress. In turn, membrane stress is a strong function of water content, dehydration rate, temperature, and heating/cooling rate. The relationship between membrane stress and fatigue life can be represented using a fatigue life curve, which is also referred to herein as an S-N curve. According to the S-N curve, an example of which is illustrated in FIG. 1, where normalized calculated stress is plotted versus membrane life for a variety of different test conditions and where membrane life is defined as the number of cycles to leak initiation, higher membrane stresses generally correspond to lower fuel cell durability.

An example of a suitable membrane stress model follows:

$$\varepsilon_{ij}(\sigma, t, T, \lambda) = \frac{\delta_{ij}}{3} B \cdot s + \frac{3}{2} \int_0^t D(t - \xi) \dot{s}_{ij}(\xi) d\xi + \delta_{ij} \beta \cdot \Delta \lambda$$

where values for membrane hydration $\lambda$, change in membrane hydration $\Delta\lambda$, membrane temperature T, the coefficient of hygro expansion $\beta$, and the uniaxial creep compliance D are input from material tests and fuel cell system tests. For the purposes of the present description $\lambda$ and $\Delta\lambda$ represent the water content of the membrane in terms of the number of water molecules per acid site with a unit of $H_2O/H^+$, $\epsilon_{ij}$ is a strain tensor, a represents stress, t represents time, $\delta_{ij}$ is the Kronecker delta, B is the bulk creep compliance, s is the dilatational component of the applied stress, $s_{ij}$ is the deviatoric component of the applied stress, and $\xi$ is an integration variable representing time. The particulars of this membrane stress model are beyond the scope of the present invention and can be gleaned from a variety of suitable teachings on stress modeling. The model is presented here merely for illustrative purposes and should not be used to limit the scope of the present invention.

In conventional fuel cell start-up strategies initial operational setpoints are established for a predefined nominal temperature and predefined stoichiometry. Typically, at idle and low power, the temperature is relatively low and the oxygen inlet flow stoichiometric ratio is relatively high. On the other hand, at full power the temperature is higher and the stoichiometric ratio is lower. The present inventors have recognized that the temperature rise during warm-up is a function the particular drive cycle employed and that an aggressive drive cycle will result in a more rapid warm-up as compared to a non-aggressive drive cycle. FIG. 2 illustrates the evolution of membrane temperature T, cathode flow field relative humidity RH, and membrane hydration $\lambda$ for a relatively aggressive drive cycle.

In FIG. 2, a plurality of wet-to-dry transitions, i.e. stack RH transitions from greater than 100% to less than 100%, are observed in the area delineated as A in the graph. Also, the most significant drops in membrane hydration occur at about 80° C. and the drying rate at this temperature is fairly rapid, i.e., approximately 100 seconds from $\lambda>13$ to $\lambda<5$. The present inventors have recognized the potential for optimizing these parameters to minimize membrane stress. More specifically, as is described in further detail herein, the present inventors have recognized that membrane stress can be minimized and membrane fatigue life can be optimized by properly controlling membrane variables like membrane dehydration rate, water content, and temperature during fuel cell start-up.

In accordance with one embodiment of the present invention, a method of operating an electrochemical conversion assembly is provided. The assembly comprises a plurality of electrochemical conversion cells, each of which comprises a membrane electrode assembly positioned between first and second reactant flowfields. According to the method, an assembly warm-up operation is executed by increasing the temperature $T_{STACK}$ of the membrane electrode assembly. Next, stoichiometry-based control of the relative humidity (RH) of one of the reactant flowfields is initiated when the temperature $T_{STACK}$ exceeds a threshold temperature $T_0$. The stoichiometry-based RH control comprises a reduction in the relative humidity from a value $RH_{WET}$ exceeding 100% relative humidity to a value $RH_{DRY}$ less than 100% relative humidity. The relative humidity value $RH_{DRY}$ is sufficiently low to permit reduction of an initial membrane hydration $\lambda_{WET}$ in the membrane electrode assembly. The reduction in the relative humidity to $RH_{DRY}$ is achieved by controlling the stoichiometry of the reactant flowfield and the temperature of the membrane electrode assembly such that the reduction to $RH_{DRY}$ decreases substantially continuously, relative to portions of the RH profile of the reactant flowfield prior to initiation of the stoichiometry-based control. The cell transitions from the stoichiometry-based RH control to generally elevated-temperature, temperature-based RH control when membrane hydration in the membrane electrode assembly falls below a target membrane hydration value $\lambda_{DRY}$.

In accordance with another embodiment of the present invention, a system is provided comprising an electrochemical conversion assembly and a assembly controller programmed to execute the stoichiometry-based and temperature-based RH control schemes of the present invention. Typically, the system is part of a vehicle and comprises a vehicle chassis and an electrochemical conversion assembly configured to act as a source of motive power for the vehicle chassis.

Accordingly, it is an object of the present invention to enhance the durability of a fuel cell utilizing a hydrated MEA. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
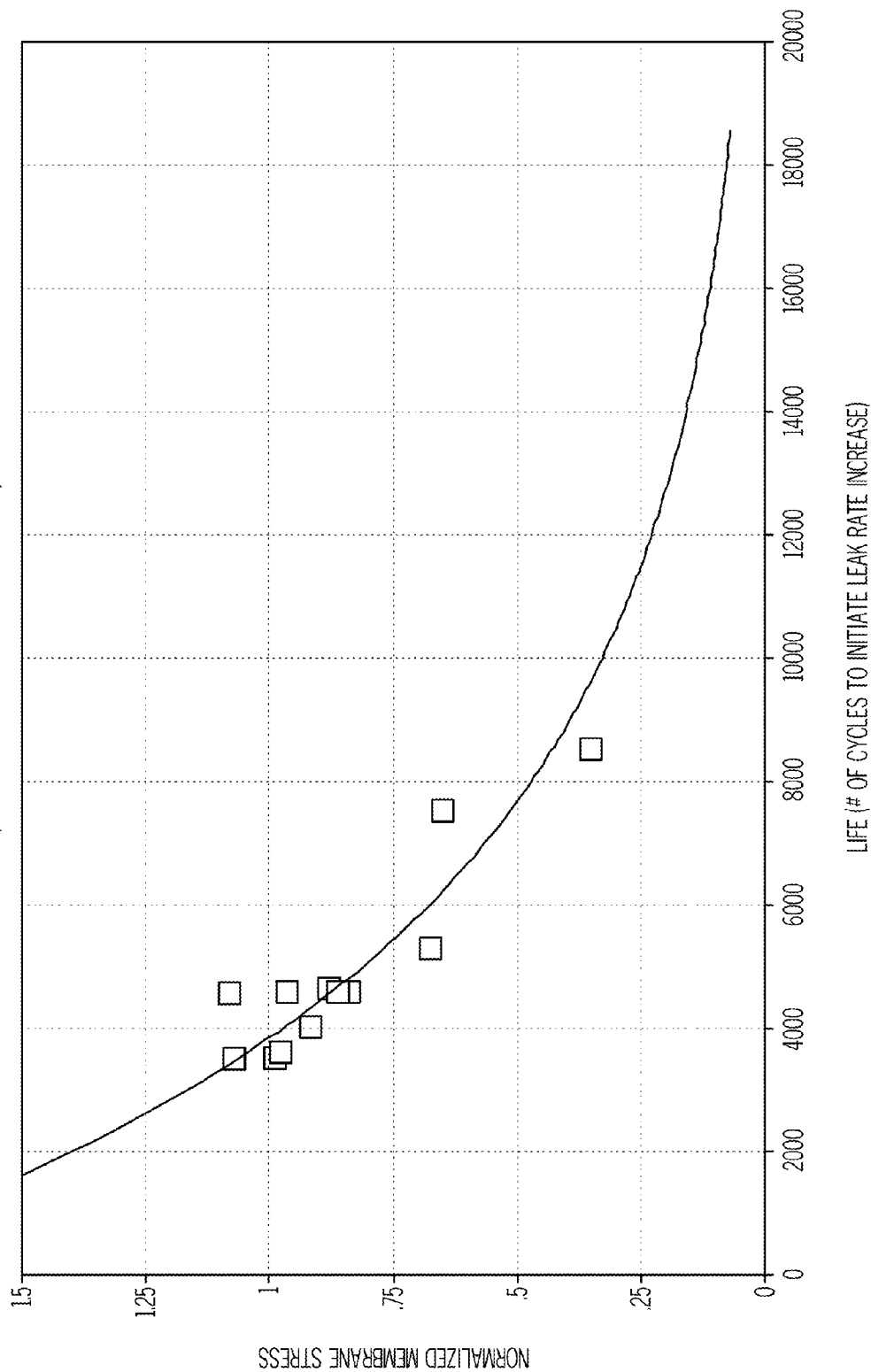
FIG. 1 is an illustration of a fatigue life curve, also referred to herein as an S-N curve, showing the relationship between membrane stress and fatigue life.
Figure 2:
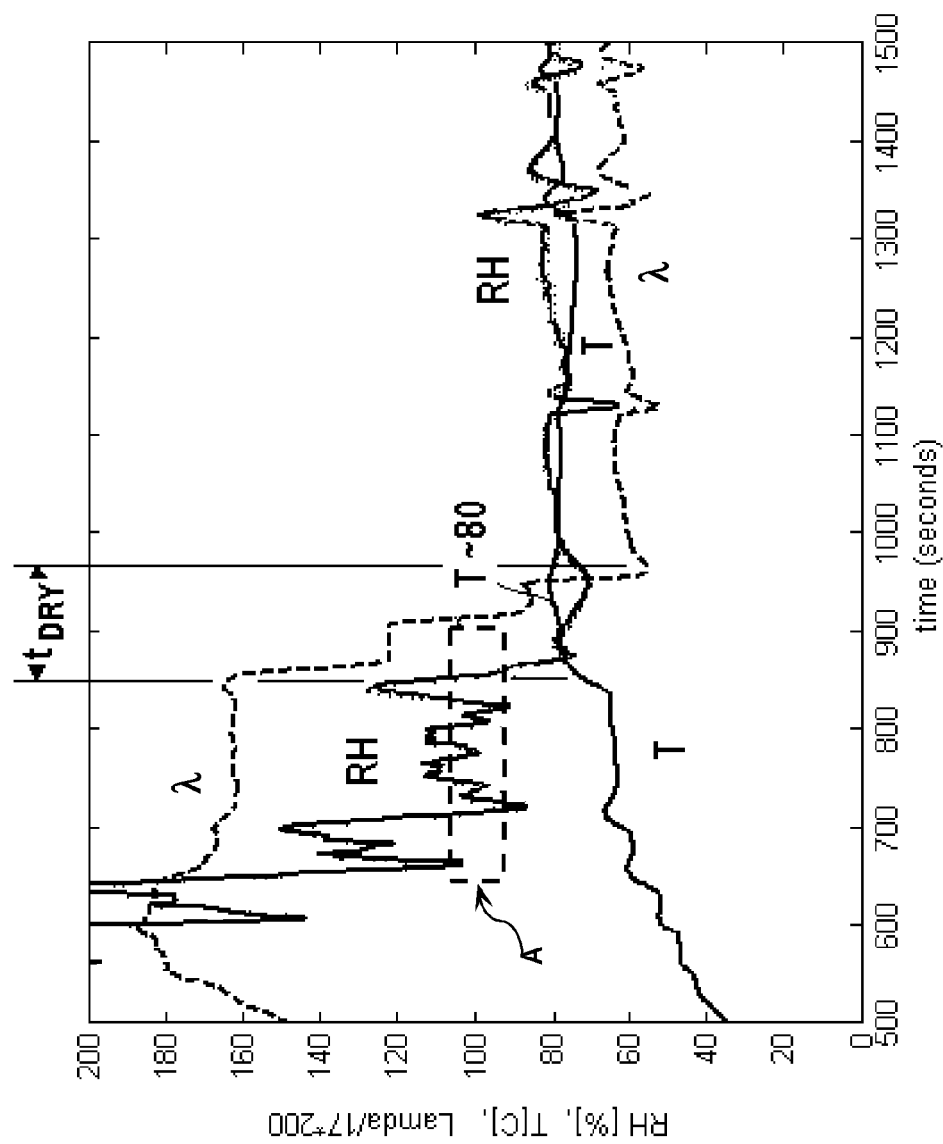
FIG. 2 illustrates the evolution of membrane temperature T, cathode flow field relative humidity RH, and membrane hydration $\lambda$ for a relatively aggressive fuel cell drive cycle.
Figure 3:
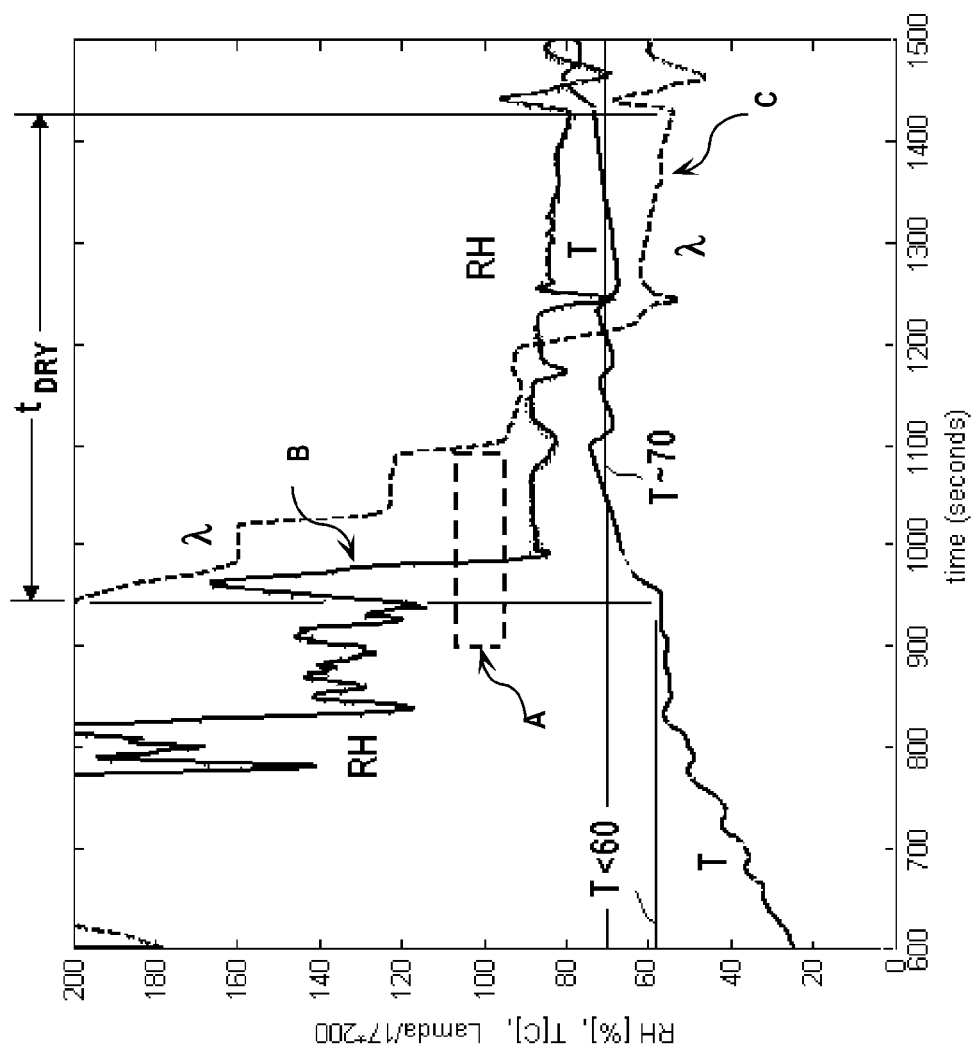
FIG. 3 illustrates the evolution of membrane temperature T, cathode flow field relative humidity RH, and membrane hydration $\lambda$ for a fuel cell drive cycle according to one embodiment of the present invention.

The details of the present invention can be illustrated in further detail by referring to FIGS. 2 and 3, each of which illustrates a different type of fuel cell cold start drive cycle. Typically, under cold start or general start-up conditions, there is a need to decrease the water content of the various proton exchange membranes of a fuel cell stack from a relatively wet condition, e.g., $\lambda > 13$, to a relatively dry condition, e.g., $\lambda < 6$. In FIG. 2, the plurality of wet-to-dry transitions, i.e. stack RH transitions from greater than 100% to less than 100%, are observed in the area delineated as A in the graph. Also, the most significant drops in membrane hydration occur at about 80° C. and the drying rate at this temperature is fairly rapid, i.e., approximately 100 seconds from $\lambda > 13$ to $\lambda < 5$. It is contemplated that these wet-to-dry transitions and the relatively rapid, high temperature dehydration illustrated in FIG. 2 will adversely affect cell performance and durability.

A method of operating an electrochemical conversion assembly according to the methodology of the present invention can be illustrated with reference to the specific embodiment illustrated in FIGS. 3 and 4. Initially, an assembly warm-up operation is executed by increasing the temperature $T_{STACK}$ of the membrane electrode assembly. This initial temperature increase is illustrated graphically in FIG. 3 in the portion of the temperature profile T preceding about 900 seconds and conceptually in FIG. 4 as "Initial Stack Warm-Up." The increase in temperature $T_{STACK}$ during the assembly warm-up operation may conveniently be at least partially attributable to waste heat produced by the vehicle or other device to which the electrochemical conversion cell is coupled.

Figure 4:
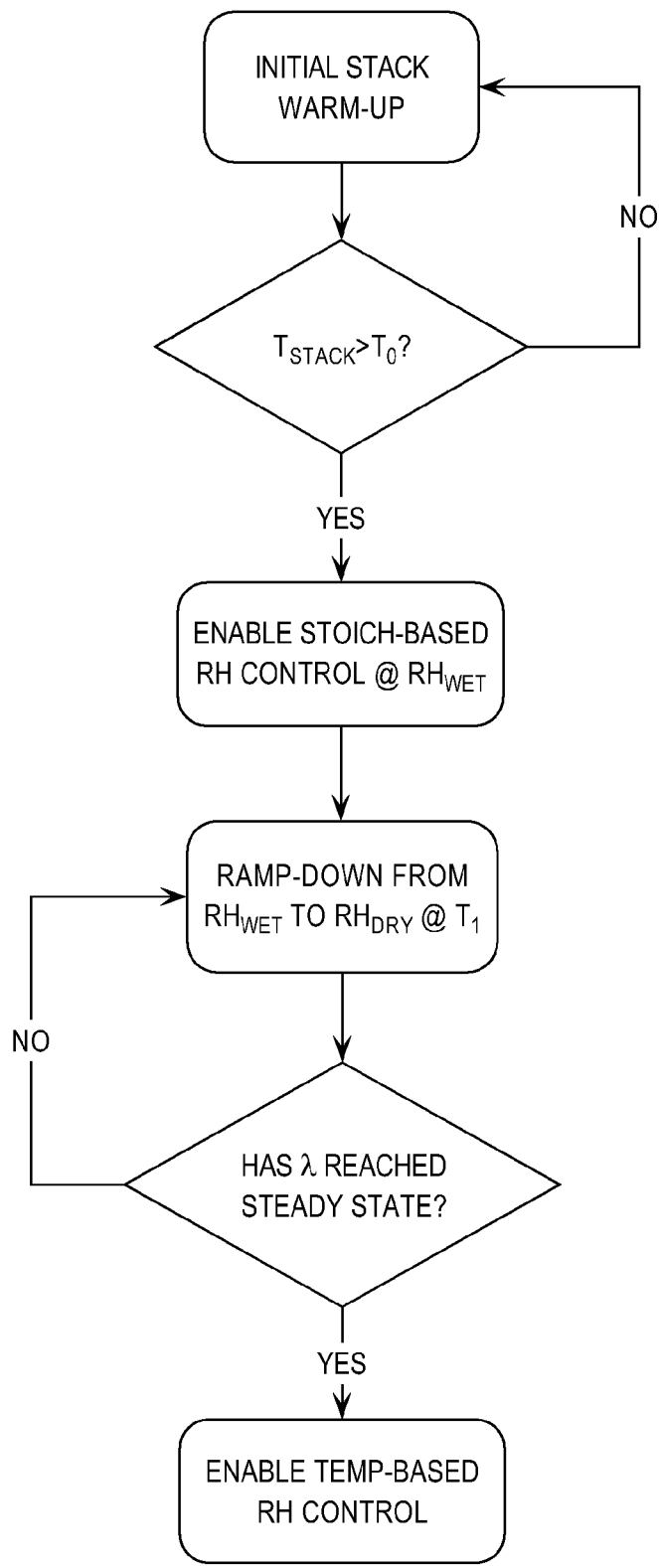
FIG. 4 is a flow chart illustrating one contemplated implementation of the present invention.

Once the temperature $T_{STACK}$ exceeds a threshold temperature $T_0$, e.g., about 60° C. in FIG. 3, stoichiometry-based control of the relative humidity (RH) of one of the reactant flowfields is initiated (see FIG. 4, "$T_{STACK} > T_0$?" and "Enable Stoich-Based RH Control"). For example, in the context of an electrochemical conversion assembly where an oxygen-containing gas is directed to the cathode flow field and a hydrogenous gas is directed to the anode flow field, stoichiometry-based RH control of the relative humidity of the cathode flow field would be initiated.

The stoichiometry-based RH control scheme comprises a reduction in the relative humidity of the flowfield from $RH_{WET}$, a value exceeding 100% relative humidity, to $RH_{DRY}$, a value less than 100% relative humidity. This reduction in the relative humidity of the flowfield is illustrated graphically in FIG. 3 in the portion of the relative humidity profile RH labeled generally as B and conceptually in FIG. 4 as "Ramp Down from $RH_{WET}$ to $RH_{DRY}$." The relative humidity value $RH_{DRY}$ should be low enough to reduce the membrane hydration $\lambda_{WET}$ in the membrane electrode assembly—a result illustrated by the membrane hydration profile $\lambda$ in FIG. 3.

Comparing the areas delineated as A in FIGS. 2 and 3, a clear difference in the behavior of the RH profile is apparent in each case. Specifically, while the stack RH transitions between values greater than 100% and less than 100% several times in the relatively aggressive cold start scheme of FIG. 2, the stack RH decreases substantially continuously from $RH_{WET}$ to $RH_{DRY}$ in the soft start control strategy illustrated in FIG. 3. As a result, it is contemplated that membrane electrode assembly subjected to soft start control strategies similar to that illustrated in FIG. 3 will enjoy extended life before significant crossover leakage occurs in the assembly.

The above-noted reduction to $RH_{DRY}$ is achieved by controlling the stoichiometry of the reactant flowfield and the temperature of the membrane electrode assembly such that the reduction to $RH_{DRY}$ is substantially continuous, relative to the portions of the RH profile prior to initiation of the stoichiometry-based control. In the illustrated embodiment, once the relative humidity falls below 100%, the RH profile remains below 100%. However, it is contemplated that stoichiometry-based RH control schemes according to the present invention may not, in some circumstances, be characterized exclusively by RH profiles that stay below 100%. Rather, in defining and describing the present invention in terms of a substantially continuous reduction of RH, relatively small scale departures from a continuous reduction from $RH_{WET}$ to $RH_{DRY}$ are contemplated, so long as the departures are more similar to the RH profile illustrated in FIG. 3, where the delineated area A includes a single transition from $RH_{WET}$ to $RH_{DRY}$, than the RH profile illustrated in FIG. 2, where the delineated are includes several transitions between RH values greater than 100% and less than 100% several times.

In the embodiment of the present invention illustrated in FIGS. 3 and 4, the conversion assembly transitions from the above-described stoichiometry-based RH control to a temperature-based RH control when membrane hydration $\lambda$ in the membrane electrode assembly falls below a target membrane hydration value $\lambda_{DRY}$. Typically, the transition to temperature-based RH control is delayed until the membrane hydration $\lambda$ falls below the target membrane hydration value $\lambda_{DRY}$ for a period of time indicative of steady state membrane hydration, as is illustrated conceptually in FIG. 4 (see "Has $\lambda$ Reached Steady State?"). For example, it may be preferable to view the hydration profile $\lambda$ of FIG. 3 as being indicative of steady state membrane hydration along the portion of the profile $\lambda$ labeled generally as C and enable temperature-based RH control at a time corresponding to a point somewhere along this portion of the profile (see "Enable Temp-Based RH Control").

The reduction from $RH_{WET}$ to $RH_{DRY}$ under stoichiometry-based RH control may preferably be executed with reference to a target membrane electrode assembly temperature $T_1$. In the illustrated embodiment, this target temperature $T_1$ is about 70° C., the projection of which is presented in FIG. 3 for illustrative purposes. It is contemplated that the stoichiometry-based RH control schemes according to the present invention can be stabilized by establishing the target temperature $T_1$ and executing the stoichiometry-based RH control with reference to the target temperature. Under temperature-based RH control, the temperature of the membrane electrode assembly is characterized by temperatures that generally exceed those reached under stoichiometry-based control.

Generally, the target membrane electrode assembly temperature $T_1$ represents a minimum temperature at which the membrane electrode assembly can operate at $RH_{DRY}$ for a given stoichiometry-based current density $I_{STOICH}$ and an initial reactant flowfield stoichiometry $STOICH_1$. For example, given an fuel cell operating with a compressor that is sized to provide air at peak flow rate that corresponds to a stoichiometry of 1.8 at maximum current density, one can determine the target membrane electrode assembly temperature $T_1$ by finding the minimum possible temperature at which the assembly can make a wet-to-dry transition. In the context of the illustrated embodiment, the minimum temperature at which the RH can be less than 90% is likely to be 79° C. However, if the max current density of the assembly is limited to 0.8 A/cm² instead of 1.2 A/cm² during warm-up we can reduce the $T_1$ from 79° to about 70° C., as is illustrated in FIG. 3, and significantly improve crossover life. Accordingly, the present invention contemplates a soft start scheme where the power level of the fuel cell is limited and stoichiometry control is used as an active knob to perform membrane drying at a target temperature $T_1$, e.g., 70° C. It is also contemplated that operation at peak current density could be achieved if the max flow of the compressor were not limited to flows that correspond to a stoichiometry of 1.8. For example, it is contemplated that an increase in compressor size would allow operation at peak current density at a stoichiometry of about 2.25.

Given the above-noted considerations regarding max current density and compressor capacity, it is contemplated that stoichiometry-based RH control schemes according to some embodiments of the present invention will be characterized by a given temperature-based current density $I_{MAX}$, a stoichiometry-based current density $I_{STOICH}$, an initial reactant flowfield stoichiometry $STOICH_1$, and an operating reactant flowfield stoichiometry $STOICH_2$ under stoichiometry-based RH control, where either the stoichiometry-based current density $I_{STOICH}$ is less than the temperature-based current density $I_{MAX}$, or the initial reactant flowfield stoichiometry $STOICH_1$ is greater than the operating reactant flowfield stoichiometry $STOICH_2$.

In practice, given an initial membrane hydration $\lambda_{WET}$ that exceeds about 12 water molecules per acid site and a target membrane hydration $\lambda_{DRY}$ that is below about 8 water molecules per acid site, it is contemplated that the above-noted reduction in the relative humidity to $RH_{DRY}$ can be achieved by controlling the stoichiometry of the reactant flowfield and the temperature of the membrane electrode assembly such that it takes more than about 200 seconds to achieve a steady state membrane hydration at $RH_{DRY}$. Typically, it will take at least about 100-200 seconds to achieve a 50% reduction in membrane hydration and stoichiometry-based RH control will be maintained for a time period $t_{DRY}$ that exceeds about 200 seconds and is often in excess of 400 seconds, as is illustrated in FIG. 3.

Figure 5:
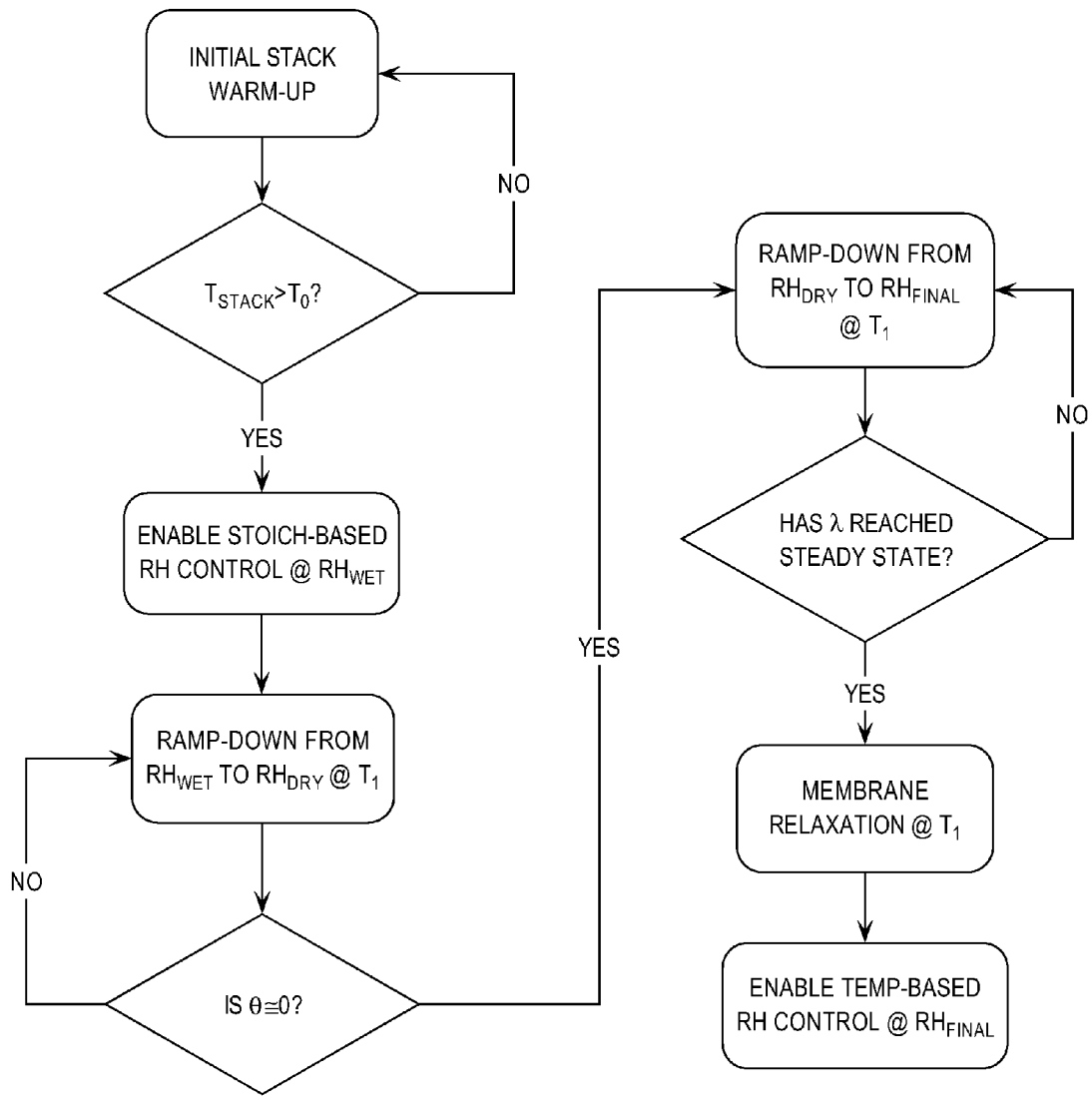
FIG. 5 is a flow chart illustrating additional contemplated implementations of the present invention.

The flow chart of FIG. 5 is similar in many respects to the flow chart of FIG. 4, with the exception that the control scheme illustrated therein includes accommodations for membrane relaxation in the membrane electrode assembly and water holdup in the flow field diffusion media of an electrochemical conversion assembly. Specifically, stoichiometry-based RH control according to the present invention may incorporate a two stage reduction in RH, where the first stage ramps down from $RH_{WET}$ to a slightly higher than usual $RH_{DRY}$ under stoichiometry-based RH control and the second stage comprises an additional reduction in relative humidity from $RH_{DRY}$ to $RH_{FINAL}$, but only when water holdup $\theta$ in the diffusion media drops below a target water holdup value. This aspect of the control scheme is illustrated with reference to the "Is $\theta \approx 0$?" decision block of FIG. 5. The initial reduction in the relative humidity from $RH_{WET}$ to $RH_{DRY}$ and the additional reduction in the relative humidity from $RH_{DRY}$ to $RH_{FINAL}$ may both be executed at substantially the same membrane electrode assembly temperature $T_1$.

The flow chart of FIG. 5 also includes a step that allows for "Membrane Relaxation at $T_1$" before temperature-based RH control is enabled. The concept of membrane relaxation is intended to cover operational parameters directed at reducing stress in the membrane electrode assembly and enhancing assembly durability. For example, and not by way of limitation, the time period represented by the membrane relaxation step could be utilized as a transition from stoichiometry-based RH control to temperature-based RH control by incorporating a supplemental membrane dehydration sequence in the control scheme. Suitable supplemental membrane dehydration sequences are disclosed in commonly assigned, co-pending U.S. patent application Ser. No. 11/464,226 (GP 306578/GMC 0075 PA), filed Aug. 14, 2006, where the membrane dehydration sequence is characterized by a drying rate that varies in a manner that substantially corresponds to a fatigue life contour map of the membrane electrode assembly.

It is contemplated that the membrane can be dehydrated in any suitable manner, including, but not limited to, dehydration through control of the temperature of the membrane, the humidity in the first reactant flowfield, the humidity in the second reactant flowfield, the flow rate in the first reactant flowfield, the flow rate in the second reactant flowfield, the gas pressure in the first reactant flowfield, and/or the gas pressure in the second reactant flowfield.

It is noted that the membrane dehydration sequence can be initiated at start-up or upon detection of a trigger signal that represents of a particular operating condition of the electrochemical conversion cell. For example, it is contemplated that the trigger signal can represent the water content of the membrane such that dehydration is initiated when the membrane hydration λ reaches a maximum value or exceeds a predetermined threshold value. Alternatively, the trigger signal may represent a temperature condition of the fuel cell, relative humidity in the reactant flowfield, the present power demand on the cell, the initiation or termination of a shut-down or start-up sequence in the cell, the completion of a hydration cycle of the cell, or combinations thereof.

In addition, it is contemplated that the dehydration sequence can be terminated upon detection of a termination signal representative of an operating condition of the electrochemical conversion cell. The termination signal can represent the water content of the membrane, the relative humidity in the reactant flowfield, power demand on the cell, the initiation or termination of a shut-down or start-up sequence in the cell, the completion of a dehydration cycle of the cell, or combinations thereof.

It is noted that terms like "preferably," "commonly," and "typically," if utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating an electrochemical conversion assembly comprising a plurality of electrochemical conversion cells, each of said cells comprising a membrane electrode assembly positioned between first and second reactant flowfields, wherein said membrane electrode assembly comprises a proton exchange membrane and said method comprises:

executing an assembly warm-up operation by increasing the temperature $T_{STACK}$ of said membrane electrode assembly;

initiating stoichiometry-based control of the relative humidity (RH) in one of said reactant flowfields when said temperature $T_{STACK}$ exceeds a threshold temperature $T_0$, wherein said stoichiometry-based RH control comprises a reduction in said relative humidity from a value $RH_{WET}$ exceeding 100% relative humidity to a value $RH_{DRY}$ less than 100% relative humidity, said relative humidity value $RH_{DRY}$ is sufficiently low to permit reduction of an initial membrane hydration $\lambda_{WET}$ in said membrane electrode assembly, said reduction in said relative humidity to $RH_{DRY}$ is achieved by controlling the stoichiometry of said reactant flowfield and the temperature of said membrane electrode assembly such that said reduction in said relative humidity to $RH_{DRY}$ decreases substantially continuously, relative to portions of the RH profile of said reactant flowfield prior to initiation of said stoichiometry-based control; and transitioning from said stoichiometry-based RH control to temperature-based RH control when membrane hydration in said membrane electrode assembly falls below a target membrane hydration value $\lambda_{DRY}$, wherein said temperature-based RH control is characterized by temperatures exceeding at least some of the temperatures characterizing said stoichiometry-based RH control.

2. A method as claimed in claim 1 wherein said transition to temperature-based RH control is delayed until said membrane hydration falls below said target membrane hydration value $\lambda_{DRY}$ for a period of time indicative of steady state membrane hydration.

3. A method as claimed in claim 1 wherein:

said reduction in said relative humidity from $RH_{WET}$ to $RH_{DRY}$ is executed with reference to a target membrane electrode assembly temperature $T_1$; and said target membrane electrode assembly temperature $T_1$ represents a minimum temperature at which said membrane electrode assembly can operate at $RH_{DRY}$ for a stoichiometry-based cunent density $I_{STOICH}$ and an initial reactant flowfield stoichiometry $STOICH_1$.

4. A method as claimed in claim 3 wherein:

said temperature-based RH control is characterized by a temperature-based cunent density $I_{MAX}$ and an operating reactant flowfield stoichiometry $STOICH_2$; and at least one of the following conditions are satisfied in the operation of said electrochemical conversion cell $I_{STOICH} < I_{MAX}$ and $STOICH_1 > STOICH_2$.

5. A method as claimed in claim 4 wherein:

$RH_{DRY}$ is less than or equal to about 90%; and $T_1$ is less than about 80° C.

6. A method as claimed in claim 4 wherein:

$RH_{DRY}$ is about 80%; and $T_1$ is about 70° C.

7. A method as claimed in claim 1 wherein:

said threshold temperature $T_0$ is less than a target membrane electrode assembly temperature $T_1$ established by said stoichiometry-based RH control; and said reduction in said relative humidity from $RH_{WET}$ to $RH_{DRY}$ is executed with reference to said target membrane electrode assembly temperature $T_1$.

8. A method as claimed in claim 1 wherein said reduction in said relative humidity to $RH_{DRY}$ is achieved by controlling the stoichiometry of said reactant flowfield and the temperature of said membrane electrode assembly such that it takes more than about 200 seconds to achieve a steady state membrane hydration at $RH_{DRY}$.

9. A method as claimed in claim 1 wherein said reduction in said relative humidity to $RH_{DRY}$ is achieved by controlling the stoichiometry of said reactant flowfield and the temperature of said membrane electrode assembly such that it takes at least about 100 seconds to achieve a 50% reduction in membrane hydration.

10. A method as claimed in claim 1 wherein said reduction in said relative humidity to $RH_{DRY}$ is achieved by controlling the stoichiometry of said reactant flowfield and the temperature of said membrane electrode assembly such that it takes at least about 200 seconds to achieve a 50% reduction in membrane hydration.

11. A method as claimed in claim 1 wherein:
said initial membrane hydration $\lambda_{WET}$ exceeds about 12 water molecules per acid site; and
said target membrane hydration $\lambda_{DRY}$ is below about 8 water molecules per acid site.

12. A method as claimed in claim 1 wherein said stoichiometry-based RH control is maintained for a time period $t_{DRY}$ that exceeds about 200 seconds.

13. A method as claimed in claim 1 wherein said stoichiometry-based RH control is maintained for a time period $t_{DRY}$ that exceeds about 400 seconds.

14. A method as claimed in claim 1 wherein said reactant flowfield comprises diffusion media configured to diffuse the flow of reactants through said flowfield and said stoichiometry-based RH control comprises an additional reduction in said relative humidity from $RH_{DRY}$ to $RH_{FINAL}$ when water holdup θ in said diffusion media drops below a target water holdup value.

15. A method as claimed in claim 14 wherein said initial reduction in said relative humidity from $RH_{WET}$ to $RH_{DRY}$ and said additional reduction in said relative humidity from $RH_{DRY}$ to $RH_{FINAL}$ are both executed at substantially the same membrane electrode assembly temperature $T_1$.

16. A method as claimed in claim 14 wherein said target water holdup value is Approximately zero.

17. A method as claimed in claim 1 wherein said transition from said stoichiometry-based RH control to said temperature-based RH control comprises a membrane relaxation period wherein said stoichiometry-based RH control is maintained for a period of time sufficient to incorporate a membrane dehydration sequence characterized by a drying rate that varies in a manner that substantially corresponds to a fatigue life contour map of said membrane electrode assembly.

18. A method as claimed in claim 1 wherein said increase in temperature $T_{STACK}$ during said assembly warm-up operation is at least partially attributable to waste heat produced by a device to which said electrochemical conversion cell is coupled.

19. A system comprising an electrochemical conversion assembly comprising a plurality of electrochemical conversion cells and an assembly controller, wherein each of said electrochemical conversion cells comprises a membrane electrode assembly positioned between first and second reactant flowfields, said membrane electrode assembly comprises a proton exchange membrane, and said asssembly controller is programmed to:
execute an assembly warm-up operation by increasing the temperature $T_{STACK}$ of said membrane electrode assembly;
initiate stoichiometry-based control of the relative humidity (RH) in one of said reactant flowfields when said temperature $T_{STACK}$ exceeds a threshold temperature $T_0$, wherein
said stoichiometry-based RH control comprises a reduction in said relative humidity from a value $RH_{WET}$ exceeding 100% relative humidity to a value $RH_{DRY}$ less than 100% relative humidity,
said relative humidity value $RH_{DRY}$ is sufficiently low to permit reduction of an initial membrane hydration $\lambda_{WET}$ in said membrane electrode assembly,
said reduction in said relative humidity to $RH_{DRY}$ is achieved by controlling the stoichiometry of said reactant flowfield and the temperature of said membrane electrode assembly such that said reduction in said relative humidity to $RH_{DRY}$ decreases substantially continuously, relative to portions of the RH profile of said reactant flowfield prior to initiation of said stoichiometry-based control; and
transition from said stoichiometry-based RH control to temperature-based RH control when membrane hydration in said membrane electrode assembly falls below a target membrane hydration value $\lambda_{DRY}$, wherein said temperature-based RH control is characterized by temperatures exceeding at least some of the temperatures characterizing said stoichiometry-based RH control.

20. A system as claimed in claim 19 wherein said system further comprises a vehicle chassis and said electrochemical conversion assembly is configured to act as a source of motive power for said vehicle chassis.

* * * * *